US005641898A

United States Patent [19]

Chang

[11] Patent Number: 5,641,898

[45] Date of Patent: Jun. 24, 1997

[54] DISTRIBUTORLESS IGNITION SYSTEM IGNITION MODULE TESTER

[76] Inventor: Tony H. Chang, P.O. Box 970, Alcoa, Tenn. 37701

[21] Appl. No.: 445,907

[22] Filed: May 22, 1995

[51] Int. Cl.[6] ..................... G01M 15/00

[52] U.S. Cl. ..................... 73/118.1; 73/116; 73/865.9

[58] Field of Search ..................... 73/865.9, 117.2, 73/117.3, 118.1, 116

[56] References Cited

U.S. PATENT DOCUMENTS

| | | | |
|---|---|---|---|
| 4,010,415 | 3/1977 | Reeves et al. | 324/165 |
| 4,010,419 | 3/1977 | Reeves et al. | 324/165 |
| 4,135,154 | 1/1979 | Ogura et al. | 73/117.3 |
| 4,312,043 | 1/1982 | Frank et al. | 73/116 |
| 4,333,054 | 6/1982 | Walker | 324/380 |
| 4,338,813 | 7/1982 | Hunninghaus et al. | 73/116 |
| 4,689,573 | 8/1987 | Hilmer | 324/380 |
| 4,812,979 | 3/1989 | Hermann et al. | 73/117.3 |
| 4,886,029 | 12/1989 | Lill et al. | 73/117.3 |
| 4,892,073 | 1/1990 | Yamamoto et al. | 364/431.04 |
| 4,893,085 | 1/1990 | Taruya et al. | 324/378 |
| 5,017,874 | 5/1991 | DiNunzio et al. | 324/378 |
| 5,361,630 | 11/1994 | Kowalski | 73/117.3 |
| 5,383,350 | 1/1995 | Bennett et al. | 73/117.3 |
| 5,386,723 | 2/1995 | Wier | 73/117.3 |
| 5,387,253 | 2/1995 | Remboski et al. | 73/117.3 |
| 5,415,035 | 5/1995 | Shimasaki et al. | 73/117.3 |
| 5,417,028 | 5/1995 | Nishimura et al. | 73/117.3 |

*Primary Examiner*—Richard Chilcot
*Assistant Examiner*—George M. Dombroske
*Attorney, Agent, or Firm*—Pitts & Brittian, P.C.

[57] ABSTRACT

An ignition module tester is provided for testing ignition modules associated with motor vehicles. The ignition module tester includes an oscillator for simulating an output signal from the pick-up coil associated with the ignition module being tested. An EXCLUSIVE-OR GATE is provided for comparing the output from the oscillator with an output signal from the ignition module, with any variance detected being indicative of a faulty ignition module. The oscillator outputs a signal at approximately equal to the frequency of a pick-up coil associated with a vehicle operating at 150 MPH, or approximately 500 Hz, such that a greater accuracy is provided by the ignition module tester as compared to conventional devices. In another embodiment, an ignition module tester is provided for testing a distributorless ignition system (DIS). The ignition module tester for use with DIS ignition modules is contained within a housing, with a plurality of leads being provided for making appropriate electrical connections. A plurality of LED's is provided for displaying the performance of the ignition module, including the ignition module output, the fuel injector feedback signal, the reference signal, and the tachometer signal. A green LED and a red LED is provided for each output signal, with a green LED indicating proper working function and a red LED indicating a malfunction. A pair of leads are provided for emulating the crank shaft signal. In similar fashion, leads are provided for emulating the cam shaft signal. A lead is provided for electrical connection to one of a plurality of pins for selecting the proper ratio of crankshaft to cam shaft signals.

11 Claims, 5 Drawing Sheets

DISTRIBUTORLESS IGNITION SYSTEM IGNITION MODULE TESTER

This application in part discloses and claims subject matter disclosed in my earlier filed pending application, Ser. No. 08/271,033 filed on Jul. 6, 1994.

TECHNICAL FIELD

This invention relates to the field of automobile repair. More specifically, the present invention is related to a device for testing the ignition associated with a vehicle engine.

BACKGROUND ART

In the field of automobile repair, it is well known that detecting a problem with an ignition can be difficult. There are devices available to professional mechanics for testing ignition modules. However, such devices are not economically available to individuals who are desirous of repairing their own automobiles. Other devices are available for testing various automobile components. These automobile components include ignition modules associated with ignition systems having a distributor. Typical of the art are those devices disclosed in the following United States Letters Patent:

| U.S. Pat. No. | Inventor(s) | Issue Date |
|---|---|---|
| 4,010,415 | G. I. Reeves, et al. | Mar. 1, 1977 |
| 4,010,419 | G. I. Reeves, et al. | Mar. 1, 1977 |
| 4,333,054 | M. J. Walker | June 1, 1982 |
| 4,689,573 | F. W. Hilmer | Aug. 25, 1987 |
| 4,812,979 | H. Hermann, et al. | Mar. 14, 1989 |
| 4,886,029 | M. P. Lill, et al. | Dec. 12, 1989 |
| 4,892,073 | N. Yamamoto, et al. | Jan. 9, 1990 |
| 4,893,085 | M. Taruya, et al. | Jan. 9, 1990 |
| 5,017,874 | V. Di Nunzio, et al. | May 21, 1991 |

Other devices have been provided such as those found in some automobile parts stores wherein an individual may bring in an ignition module to be tested. This obviously requires the removal of the ignition module from the automobile. However, it is known that these devices do not accurately and dynamically test ignition modules in every case, especially when the ignition module has a minor problem.

In the event the tester is used at a parts retailer, if the ignition module is not in need of replacement or repair, then it is reinstalled in the automobile. In that case, further investigation must be made to determine the cause of the problem. Due to the difficulties involved in testing an ignition module, it is often replaced whether or not it is faulty. This can be an expensive alternative.

Those devices disclosed that are provided for testing the integrity of ignition modules, as stated above, are typically provided for testing ignition modules associated with ignition systems having a distributor. However, the manufacture of vehicle engines is currently progressing to a point wherein conventional distributors are no longer used. Because these devices simulate the function of a distributor, such cannot be used in the more advanced distributorless ignition systems.

Hence, it is desirable to have a device which may be used for testing ignition modules associated with distributorless ignition systems. Further it is desirable to provide a testing device which more accurately tests the integrity of ignition modules when compared to conventional devices.

Therefore, it is an object of this invention to provide a device for testing automobile ignition modules associated with distributorless ignition systems.

Further, it is an object of the present invention to provide such a device whereby greater accuracy is attained over testing devices of the prior art.

DISCLOSURE OF THE INVENTION

Other objects and advantages will be accomplished by the present invention which serves to test an ignition module associated with a vehicle motor. The ignition module tester includes an oscillator for simulating an output signal similar to that of the conventional pick-up coil associated with the ignition module. The oscillator signal delivered to the ignition module is continuously compared to an output signal from the ignition module. If any variance is detected, the ignition module is determined to be defective.

The power supply is activated upon closing the ON/OFF switch. When the ON/OFF switch is activated, power is supplied to the oscillator and to an EXCLUSIVE-OR GATE. An LED is provided for indicating when the power to the ignition module tester is ON. Green and red LED are provided for indicating the condition of the ignition module.

The signal delivered from the oscillator to the ignition module is processed within the ignition module to produce an output signal therefrom to the ignition module tester. This signal is then delivered to the EXCLUSIVE-OR GATE where it is compared to the original output signal from the oscillator. If the two signals received and compared by the EXCLUSIVE-OR GATE are equal at a particular point in time, then the indication at that point in time is that the ignition module is good, and vice versa. The EXCLUSIVE-OR GATE provides a continuous comparison such that if at any point during the comparison the signals are different, the tester will indicate a faulty ignition module.

A RESET switch is provided such that when engaged, the circuit is reset and, when the RESET switch is released, a new test is performed.

In an alternate embodiment of the present invention, an ignition module tester is provided for testing a distributorless ignition system (DIS). In a DIS, the crank shaft creates a pulsed signal as it is rotated, with a given number of pulses being emitted during each revolution of the crank shaft. The cam creates a second pulsed signal, in similar fashion, as it is rotated, with a second given number of pulses being emitted during each revolution of the cam shaft. The frequency of the pulses of the crank shaft signal is a multiple of the frequency of the cam shaft signals. Either pulsed signals or square wave signals may be delivered to the ignition module. The ignition module in this type of system compares the frequency of the crank shaft and cam shaft signals to determine when each pulses coincidentally. When the pulses of the two signals coincide, the ignition module causes one of the spark plugs to fire. The next coincidence of these signal pulses causes the next appropriate spark plug to fire, and so on. A reference signal is delivered to a vehicle computer. A feedback signal is also delivered from the ignition module to the vehicle computer as a control signal for the fuel injectors. Further, a signal is delivered to the tachometer for determining the operating speed of the engine measured, in the preferred embodiment, in revolutions per minute (r.p.m's).

The ignition module tester of the present invention for use with DIS ignition modules is contained within a housing, with a plurality of leads being provided for making appropriate electrical connections. A plurality of LED's is provided for displaying the performance of the ignition module, including the ignition module output, the fuel injector feedback signal, the reference signal, and the tachometer signal. A green LED and a red LED is provided for each output signal, with a green LED indicating proper working function and a red LED indicating a malfunction.

Operation of the ignition module tester is controlled via a processor. Electrical connection to a power source such as the vehicle battery is made via positive leads and ground leads. A pair of leads are provided for replacement of the pick-up coil lead associated with the crank shaft. The proper lead is selected depending upon the type of sensor. In similar fashion, leads are provided for emulating the cam shaft signal. A lead is also provided for electrical connection to one of a plurality of pins for selecting the proper ratio of crankshaft to cam shaft signals.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

An ignition module tester incorporating various features of the present invention is illustrated generally at 10 in the figures. The ignition module tester 10 is designed for quickly, dynamically and accurately testing the condition and performance of a vehicle ignition coil 54. Moreover, in the preferred embodiment the ignition module tester 10 is designed to be portable and economical. In an alternate embodiment, the ignition module tester 10' is designed for testing the ignition module of a distributorless ignition system (DIS).

Figure 1:
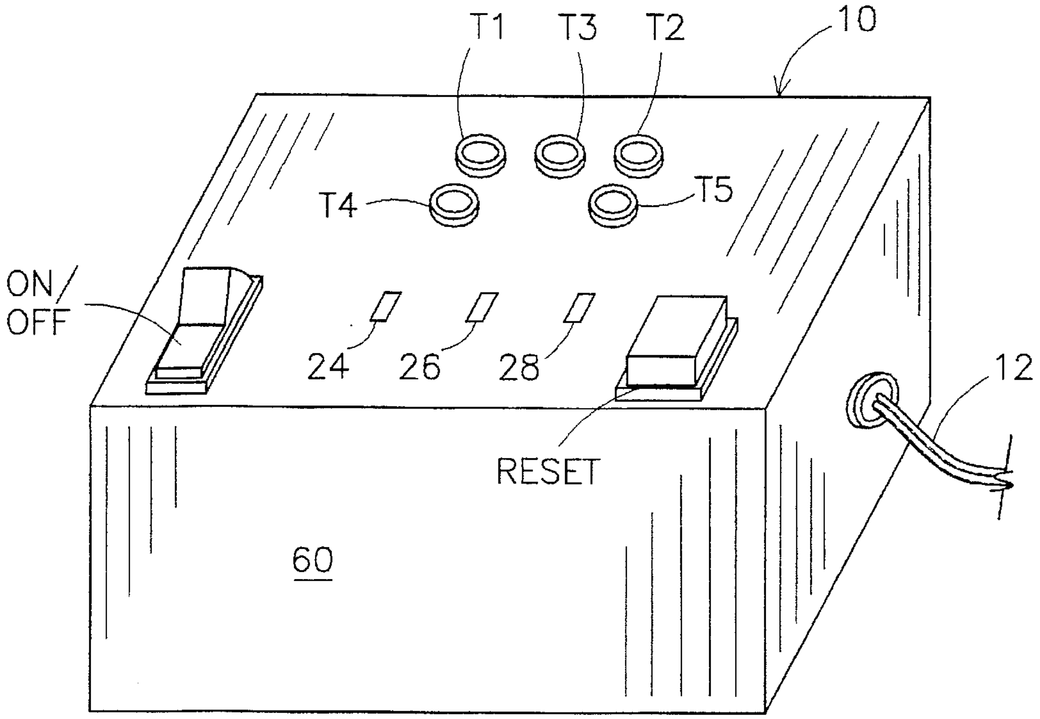
FIG. 1 is a perspective view of the ignition module tester constructed in accordance with several features of the present invention.

FIG. 1 illustrates a preferred embodiment of the ignition module tester 10 of the present invention. As illustrated, the circuitry associated with the present invention is contained within a housing 60, with terminals T1–T5 being provided for making appropriate electrical connections. A.C. power is supplied through a power cord 12. An ON/OFF switch for activating the ignition module tester 10 is carried by the housing 60. A RESET switch is provided for initiating a new test.

Figure 2:
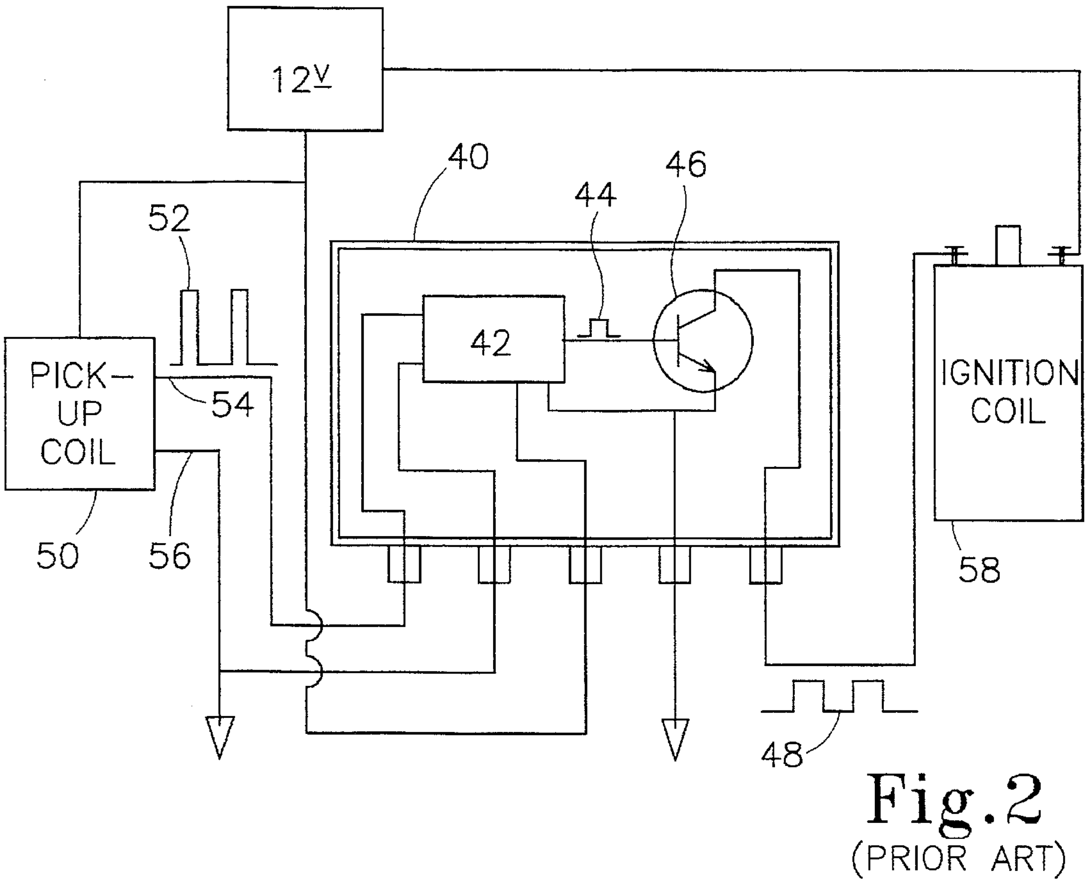
Fig.2 (PRIOR ART)
FIG. 2 is a schematic diagram of a typical vehicle ignition system shown in electrical connection for standard operation.

FIG. 2 schematically illustrates a conventional vehicle ignition module 40 in electrical connection with the various electrical components of the vehicle engine (not shown). A pick-up coil 50 is electrically connected to the ignition module 40 and delivers a signal 52 depicted as a pulsed square wave. The input signal 52 is received by the ignition module processor 42 which then outputs a signal 44 in the form of a square wave to the main power switch 46, which is illustrated as a power transistor. The pulsing of the main power switch 46 as a result of the square wave signal 44 yields an ignition module output signal 48 in the form of a square wave delivered to the ignition coil 58. The pick-up coil 50 and the ignition module 40 are driven by the vehicle battery which typically supplies $12^V$.

Figure 3:
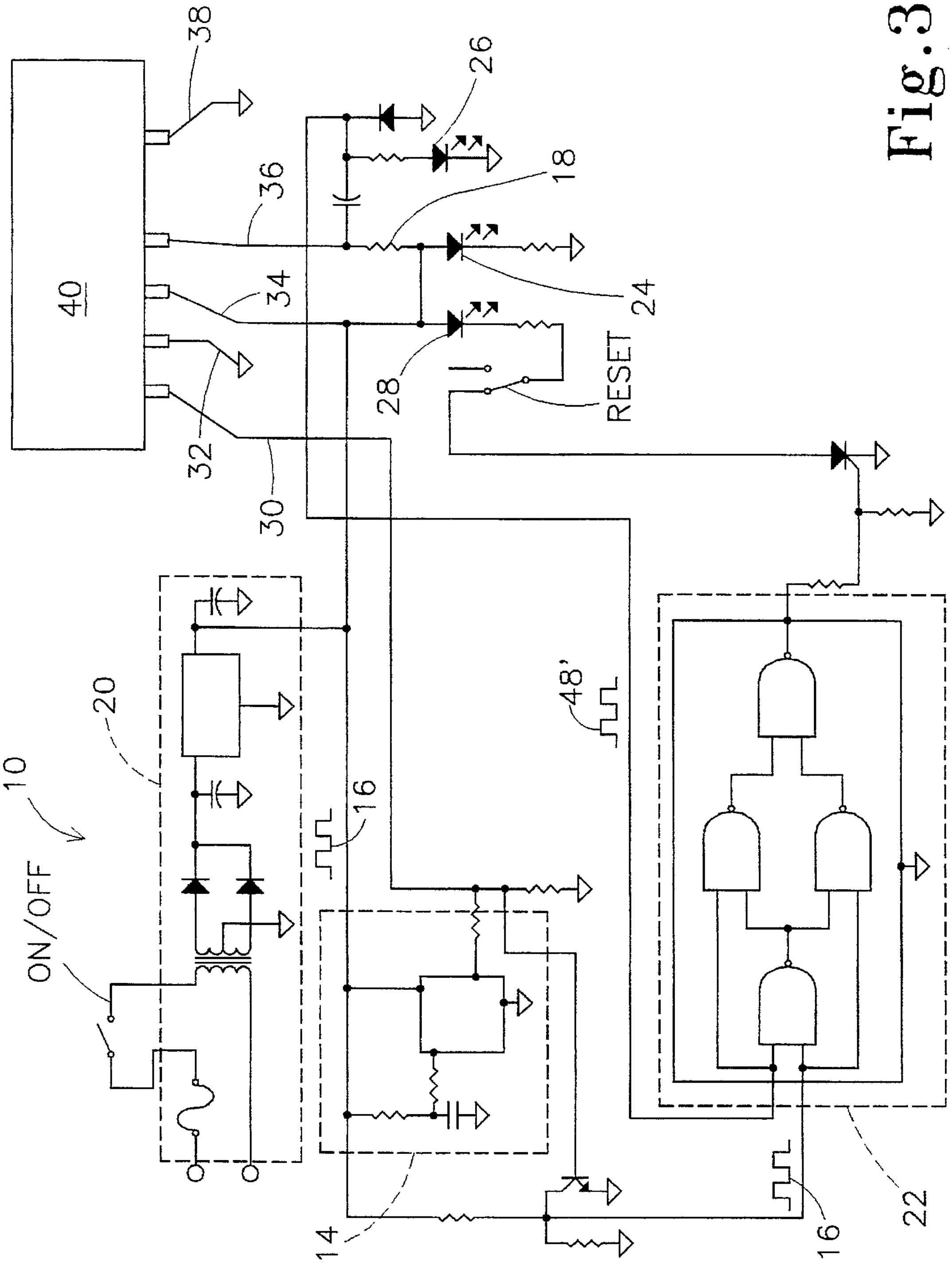
FIG. 3 is a schematic diagram of the electrical circuitry of the present invention shown in relation to a conventional ignition module to be tested.

FIG. 3 illustrates a schematic diagram of the circuitry associated with the ignition module tester 10 of the present invention, wherein the pick-up coil 50 is simulated with a signal generator 14, such as the illustrated oscillator, and the ignition coil 58 is simulated with a resistive load 18 Further, a power source 20 is provided to convert A.C. power to D.C. such that the vehicle battery is obviated.

In order to electrically connect the ignition module tester 10 of the preferred embodiment to an ignition module 40 to be tested, as illustrated, terminal T1 is connected through a connector wire 30 to the terminal on the ignition module 40 at which the high side wire 54 of the vehicle pick-up coil 50 is typically connected. Terminal T4 is connected in similar fashion through lead wire 32 to the terminal on the ignition module 40 at which the low side wire 56 of the pick-up coil 50 is typically connected. A lead wire 34 is connected between terminal T3 and the ignition module terminal at which the vehicle battery is typically connected. Terminal T2 is in electrical connection through lead wire 36 with the high voltage coil terminal on the ignition module 40. Finally, Terminal T5 is in electrical connection with the ground point of the ignition module 40 through lead wire 38.

The power supply 20 is activated upon closing the ON/OFF switch. When the ON/OFF switch is activated, power is supplied to the oscillator 14 and to a comparator 22 such as the illustrated EXCLUSIVE-OR GATE. Further, a yellow LED 24 is energized to indicate that the power is ON, and either a green or a red LED 26,28, or both, will be illuminated to indicate the condition of the ignition module 40. It is also possible that neither of the three LED's 24,26,28 will be illuminated. The oscillator 14 is provided for supplying the square wave signal 16 simulating the signal 52 output by the pick-up coil 50 to the ignition module processor 42. This signal 16 is also delivered to the EXCLUSIVE-OR GATE 22 for comparison.

The signal 16 delivered from the oscillator 14 through terminal T1 to the ignition module 40 is processed within the ignition module 40 to produce the output signal 48' therefrom to the ignition module tester 10 through terminal T2. This signal 48' is then delivered to the EXCLUSIVE-OR GATE 22 where it is compared to the original output signal 16 from the oscillator 14. If the two signals 14,48' received and compared by the EXCLUSIVE-OR GATE 22 are equal at a particular point in time, then the indication at that point in time is that the ignition module 40 is good, and vice versa. The EXCLUSIVE-0R GATE 22 provides a continuous comparison such that if at any point during the comparison the signals 16,48' are different, the tester 10 will indicate a faulty ignition module 40. Specifically, the EXCLUSIVE-0R GATE 22 compares the feedback signal 48' with the reference signal 16 to determine any amplitude, timing, and shaping variance between the two.

In order to provide a more accurate test than conventional testing devices, the oscillator 14 of the preferred embodiment outputs a signal 16 at approximately equal to the frequency of the output signal 52 from a conventional pick-up coil 50 associated with a vehicle operating at 150 MPH, and preferrably at a frequency of approximately 500 Hz. This allows for a greater likelihood of detecting a variance in the pulsing of the ignition module processor 42 or main power switch 46. The oscillator 14 of the preferred embodiment has a fifty percent (50%) duty cycle which allows for the detection of intermittent problems.

When the RESET switch is engaged, the circuit is opened such that when released, a new test is performed. It is typically preferred that the RESET switch be engaged at least once to ensure the results are accurate.

Several results are possible when testing with the tester of the present invention. First, the green LED 26 is illuminate and the red LED 28 is not. This is the indication for a good ignition module 40. If the ignition module 40 is determined to be in good condition, the lead wire 34 connected through terminal T3 is removed, followed by the lead wire 38 connected through terminal T5. If after these lead wires 34,38 have been disconnected the green LED 26 remains illuminated, then the ignition module 40 is defective.

Second, the red LED 28 is illuminated and the green LED 26 is not, which is indicative of a bad ignition module 40. However, in this instance, the illumination of the red LED 28 may be caused by a reversal of the lead wires 30,32 connected at terminals T1 and T4. To test for this event, the power is turned OFF, the lead wires 30,32 switched, and the tester 10 is powered back ON. At this point, illumination of the red LED 28 indicates a faulty ignition module 40.

If both the green and red LED's 26,28 are illuminated, this is indication that the ignition module 40 is bad. However, this is a situation where the RESET button is activated to ensure that the result is accurate. If neither of the green or red LED's 26,28 is illuminated, but the yellow LED 24 is illuminated indicating the power is ON, then a faulty connection has been made at some point. In this situation, the connection of the lead wires 30,32,34,36,38 must be inspected. If all three of the yellow, green and red LED's 24,26,28 remain OFF, then the ignition module 40 is determined to be faulty.

After the desired testing has been performed, the ignition module tester 10 is disconnected from the ignition module 40. The ignition module 40 is then either replaced or re-installed, depending upon the results of the tests.

Figure 4:
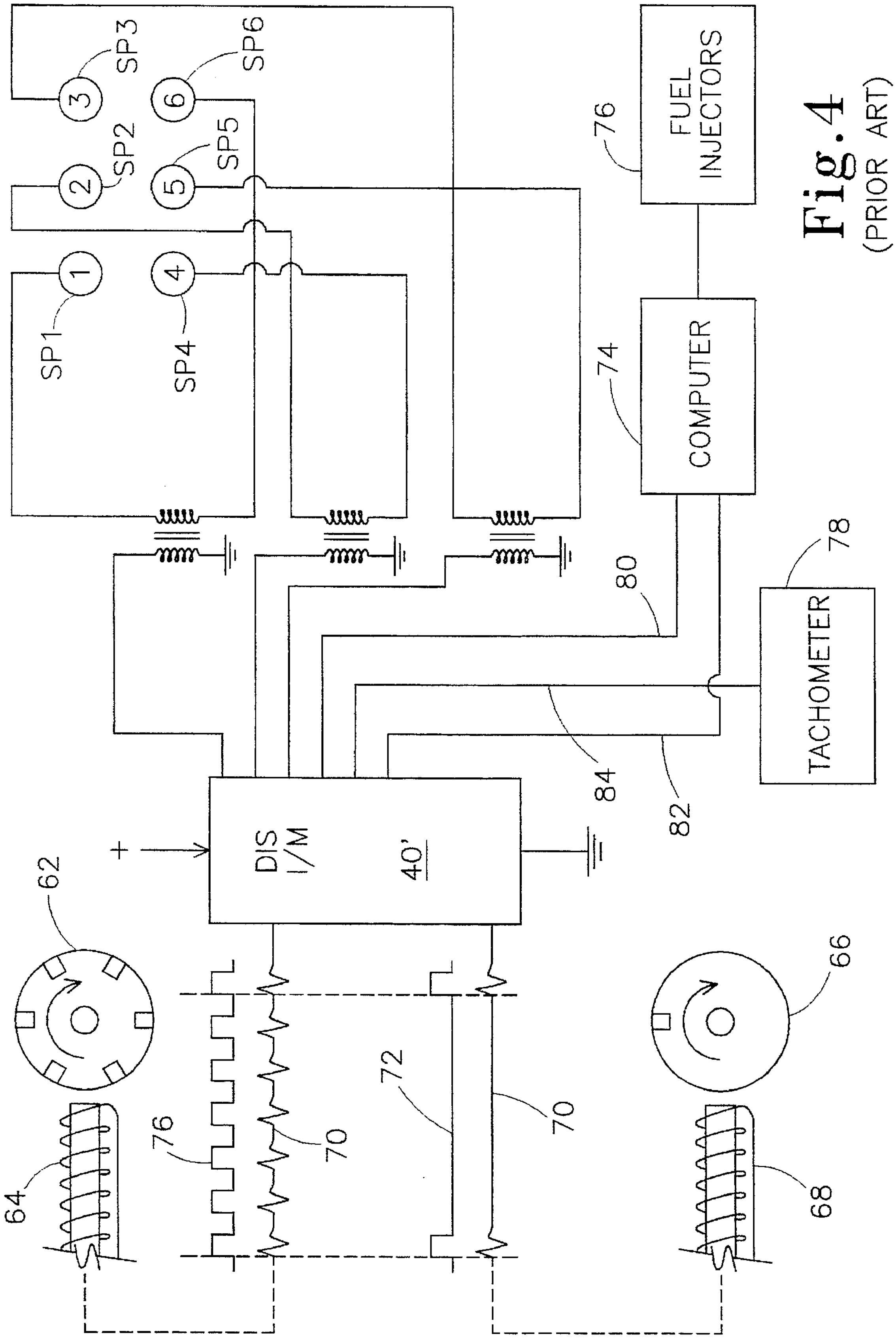
Fig. 4 (PRIOR ART)
FIG. 4 is a schematic diagram of a typical distributorless ignition system shown in electrical connection for standard operation.
Figure 5:
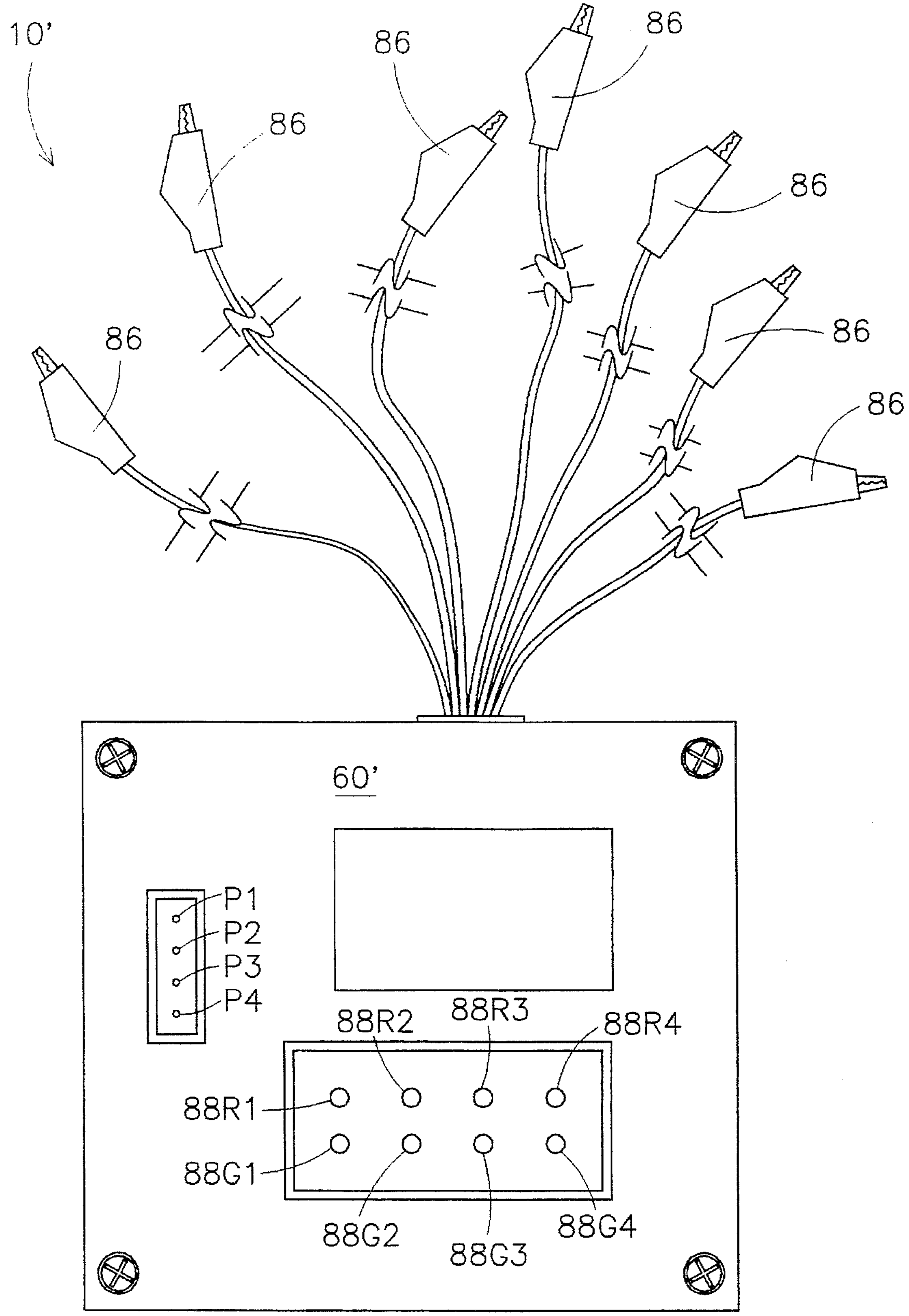
FIG. 5 is a top plan view of an alternate embodiment of the ignition module tester constructed in accordance with several features of the present invention.
Figure 6:
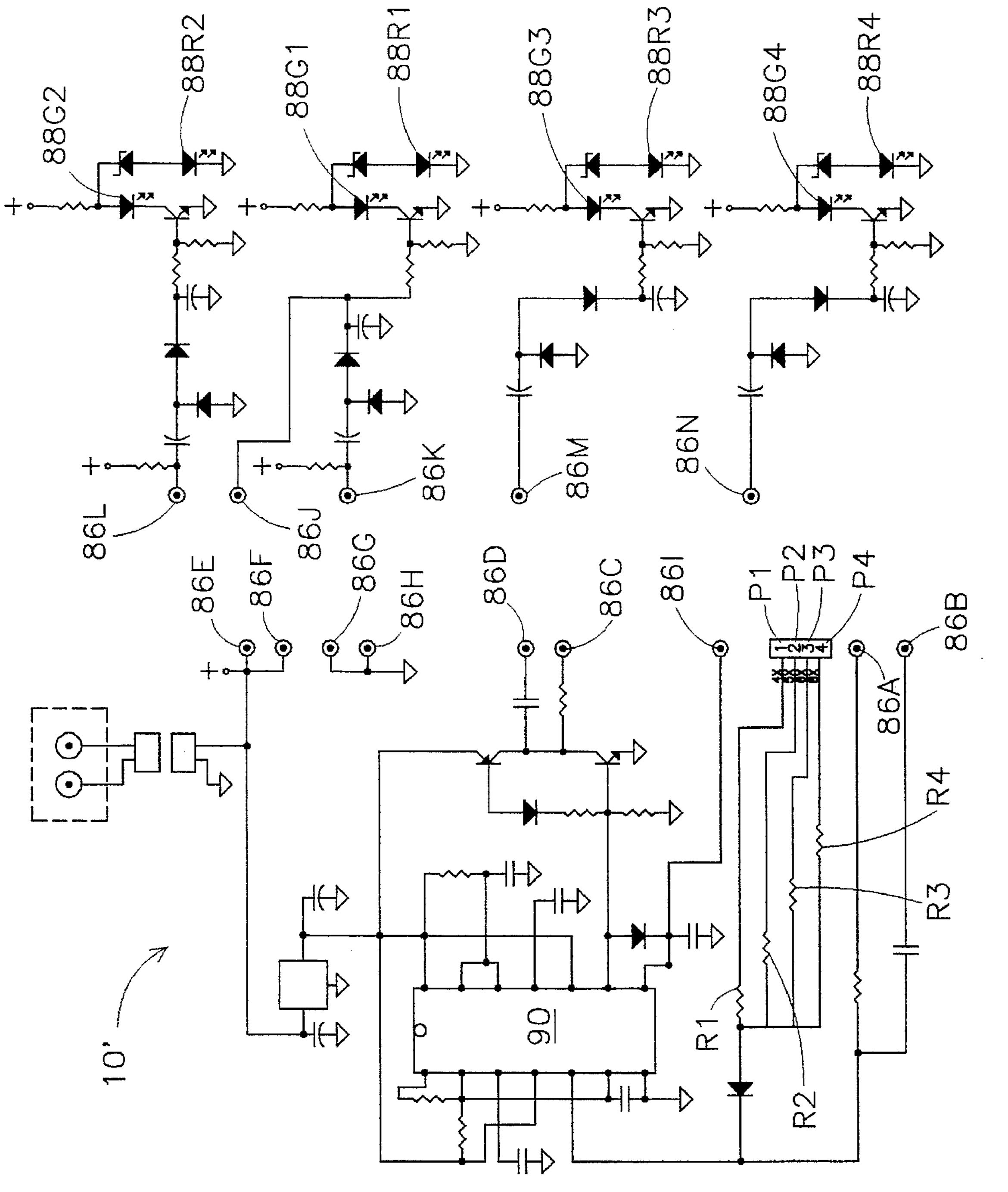
FIG. 6 is a schematic diagram of the electrical circuitry of the ignition module tester of FIG. 5.

FIGS. 5 and 6 illustrate an alternate embodiment of the present invention which is provided for testing a distributorless ignition system (DIS) 11 such as that illustrated in FIG. 4. As illustrated in FIG. 4, the crank shaft 62 creates a pulsed signal as it is rotated, with a given number of pulses being emitted during each revolution of the crank shaft 62. A pulse is generated each time a notch on the perimeter of the crank shaft 62 comes into close proximity to a pick-up coil 64. The cam shaft 66 creates a second pulsed signal, in similar fashion, as it is rotated, with a second given number of pulses being emitted during each revolution of the cam shaft 66. The frequency of the pulses of the crank shaft 62 signal is a multiple of the frequency of the cam shaft 66 signals. For example, the ratio of the crank shaft 62 to cam shaft 66 signals may be 4:1, 5:1, 6:1, or any other such ratio. It is known that in some vehicles, this ratio is as high as 54:1. In the illustration of FIG. 4, the ratio of crank shaft 62 to cam shaft 66 signals is 6:1.

As illustrated, either pulsed signals 70 or square wave signals 72 may be delivered to the ignition module 40'. A pick-up coil 64,68 known conventionally as a Hall sensor produces a square wave signal 72. A pick-up coil 64,68 known in the art as a reluctant sensor produces a pulse signal 70.

The DIS ignition module 40' compares the frequency of the crank shaft 62 and cam shaft 66 signals to determine when each pulses coincidentally. When the pulses of the two signals coincide, the DIS ignition module 40' causes one of the spark plugs SP to fire. The next coincidence of these signal pulses causes the next appropriate spark plug SP to fire, and so on. A typical order of firing the spark illustrated in FIG. 4 is SP1, SP6, SP2, SP4, SP3, SP5, with the spark plugs SP1–SP6 being arranged in the proper order on the engine block.

A reference signal 80 is delivered to a vehicle computer 74. A feedback signal 82 is also delivered from the DIS ignition module 40' to the vehicle computer 74 as a control signal for the fuel injectors 76. Further, a signal 84 is delivered to the tachometer 78 for determining the operating speed of the engine measured, in the preferred embodiment, in revolutions per minute (r.p.m.'s).

FIG. 5 illustrates a preferred embodiment of the ignition module tester 10' of the present invention for use with distributorless ignition system modules 40'. As illustrated, the circuitry associated with the present invention is contained within a housing 60', with a plurality of leads 86 being provided for making appropriate electrical connections. A plurality of LED's 88 is provided for displaying the performance of the DIS ignition module 40', including the DIS ignition module 40' output, the fuel injector feedback signal 82, the reference signal 80, and the tachometer signal 84. As illustrated, a green LED 88G and a red LED 88R is provided for each output signal, with a green LED 88G indicating proper working function and a red LED 88R indicating a malfunction.

FIG. 6 is an electrical schematic of the circuitry associated with the ignition module tester 10' of the present invention. Operation of the ignition module tester 10' is controlled via the processor 90. The processor 90 operates in part as two oscilators for emulating the signals produced by the crank shaft pick-up coil 64 and the cam shaft pick-up coil 68 A plurality of leads 86 are provided for electrically connecting the ignition module tester 10' to the DIS ignition module 40' for testing purposes. Electrical connection to a power source Such as the vehicle battery is made via positive leads 86E,F, and ground leads 86G,H. A pair of leads 86A,B are provided for replacement of the pick-up coil 64 lead associated with the crank shaft 62. The proper lead 86A,B is selected depending upon the type of sensor 64. For a Hall sensor, lead 86A is selected. For a reluctant sensor, lead 86B is selected. In similar fashion, leads 86C,D are provided for emulating the cam shaft 66 signal from a Hall sensor and a reluctant sensor, respectively.

Lead 86I is provided for electrical connection to one of a plurality of pins P for selecting the proper ratio of crank shaft 62 to cam shaft 66 signals. In the illustrated embodiment, pins P1,P2,P3,P4 are provided for selecting ratios of 4:1, 5:1, 6:1, and 8:1, respectively. The particular ratio is determined by the value of the resistance of the resistors R1,R2, R3,R4. For DIS ignition modules 40' associated with systems having a crank shaft 62 to cam shaft 66 signal ratio of something other than those provided, the pin P having a ratio which is a factor of the system ratio is selected. Intermediate pulses are ignored by the DIS ignition module 40'. For example, if the system ratio is 12:1, pin P3 is selected and provides two pulses in the time the DIS ignition module 40' expects one. Thus, every other pulse is ignored by the DIS ignition module 40'. Of course, more of fewer than four pins P may be provided with ratios other than 4:1, 5:1, 6:1, and 8:1.

Leads 86J,K are provided for emulating the feedback signal conventionally provided for controlling the operation of the fuel injectors 76. Lead 86J is provided for use in association with direct current power sources, while lead 86K is provided for use in association with alternating current power sources. Associated with the lead 86L are two LED's 88R1,G1. LED 88R1 is indicative of a failure of the particular circuitry within the DIS ignition module 40'. Similarly, the LED 88G1 is indicative of no failure.

Lead 86L is provided for testing the output of the DIS ignition module 40' used to control the firing of the spark plugs SP. Associated with the lead 86L are two LED's 88R2,G2. LED 88R2 is indicative of a failure of the particular circuitry within the DIS ignition module 40'. Similarly, the LED 88G2 is indicative of no failure.

Lead 86M is provided for testing the output of the DIS ignition module 40' used as the reference signal delivered to the vehicle computer 74. Associated with the lead 86M are two LED's 88R3,G3. LED 88R2 is indicative of a failure of the particular circuitry within the DIS ignition module 40'. Similarly, the LED 88G3 is indicative of no failure.

Lead 86N is provided for testing the output of the DIS ignition module 40' used to control the tachometer 78. Associated with the lead 86N are two LED's 88R4,G4. LED 88R4 is indicative of a failure of the particular circuitry within the DIS ignition module 40'. Similarly, the LED 88G4 is indicative of no failure.

From the foregoing description, it will be recognized by those skilled in the art that an ignition module tester offering advantages over the prior art has been provided. Specifically, the ignition module tester serves to accurately determine whether or not an ignition module is defective. Further, the ignition module tester, due to the nature of the circuitry and hardware components, is easily portable and is relatively inexpensive to manufacture and therefore purchase. Hence, the ignition module tester of the present invention is a device which can easily be afforded and used by the general public. Further, the ignition module tester of the present invention provides an increased accuracy over conventional ignition module testers used by professional mechanics and automobile parts suppliers. In the alternate embodiment, a device is provided for testing the integrity of an ignition module associated with a distributorless ignition system.

While a preferred and an alternate embodiment have been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. An ignition module tester for testing a vehicle engine ignition module associated with a distributorless ignition system (DIS), the vehicle engine ignition module hereinafter referred to as a DIS ignition module, the DIS ignition module having a plurality of electrical input terminals associated with a crank shaft pick-up coil and a cam shaft pick-up coil, the DIS ignition module having a plurality of output terminals associated with a vehicle computer, a tachometer, a plurality of fuel injectors, and a plurality of spark plugs, the DIS ignition module being powered by a direct current battery, the plurality of electrical terminals of the DIS ignition module being provided for electrical connection to the crank shaft pick-up coil, the cam shaft pick-up coil, the direct current battery, the vehicle computer, and the tachometer, said ignition module tester comprising:

a processor including at least one electrical terminal for electrical connection thereof to the DIS ignition module for producing a first DIS ignition module input signal emulating the crank shaft input signal and a second DIS ignition module input signal emulating the cam shaft input signal;

at least one input lead for electrically connecting said processor to at least one of the plurality of DIS ignition module input terminals;

at least one output lead for electrically connecting said ignition module tester to at least one of the plurality of DIS ignition module output terminals; and an indicator associated with said at least one output lead for indicating a condition of the DIS ignition module.

2. The ignition module tester of claim 1 wherein said indicator includes a first visual indicator for indicating said condition as non-defective and a second visual indicator for indicating said condition as defective.

3. The ignition module tester of claim 2 wherein said first indicator is an LED for emitting light of a first color and wherein said second visual indicator is an LED for emitting light of a second color.

4. The ignition module tester of claim 1 wherein said first DIS ignition module input signal is produced as a pulsed signal and as a square wave signal, and wherein said second DIS ignition module input signal is produced as a pulsed signal and as a square wave signal, said at least one electrical terminal including one electrical terminal for electrical connection to said first DIS ignition module input signal produced as a pulsed signal, one electrical terminal for electrical connection to said first DIS ignition module input signal produced as a square wave signal, one electrical terminal for electrical connection to said second DIS ignition module input signal produced as a pulsed signal, and one electrical terminal for electrical connection to said second DIS ignition module input signal produced as a square wave signal.

5. The ignition module tester of claim 1 wherein said at least one output lead is provided for electrical connection to the DIS ignition module output terminal associated with the vehicle computer.

6. The ignition module tester of claim 1 wherein said at least one output lead is provided for electrical connection to the DIS ignition module output terminal associated with the tachometer.

7. The ignition module tester of claim 1 wherein said at least one output lead is provided for electrical connection to the DIS ignition module output terminal associated with the plurality of fuel injectors.

8. The ignition module tester of claim 1 wherein said at least one output lead is provided for electrical connection to the DIS ignition module output terminal associated with at least one of the plurality of spark plugs.

9. An ignition module tester for testing a vehicle engine ignition module associated with a distributorless ignition system (DIS), the vehicle engine ignition module hereinafter referred to as a DIS ignition module, the DIS ignition module having a plurality of electrical input terminals associated with a crank shaft pick-up coil and a cam shaft pick-up coil, the DIS ignition module having a plurality of output terminals associated with a vehicle computer, a tachometer, a plurality of fuel injectors, and a plurality of spark plugs, the DIS ignition module being powered by a direct current battery, the plurality of electrical terminals of the DIS ignition module being provided for electrical connection to the crank shaft pick-up coil, the cam shaft pick-up coil, the direct current battery, the vehicle computer, and the tachometer, said ignition module tester comprising:

a processor including at least one electrical terminal for electrical connection thereof to the DIS ignition module for producing a first DIS ignition module input signal emulating the crank shaft input signal and a second DIS ignition module input signal emulating the cam shaft input signal;

at least one input lead for electrically connecting said processor to at least one of the plurality of DIS ignition module input terminals;

a first output lead for electrical connection to the DIS ignition module output terminal associated with the vehicle computer;

an indicator associated with said first output lead for indicating a condition of the DIS ignition module output to the vehicle computer, said indicator including a first visual indicator for indicating said condition as non-defective and a second visual indicator for indicating said condition as defective;

a second output lead for electrical connection to the DIS ignition module output terminal associated with the tachometer;

an indicator associated with said second output lead for indicating a condition of the DIS ignition module output to the tachometer, said indicator including a first visual indicator for indicating said condition as non-defective and a second visual indicator for indicating said condition as defective;

a third output lead for electrical connection to the DIS ignition module output terminal associated with the plurality of fuel injectors;

an indicator associated with said third output lead for indicating a condition of the DIS ignition module output to the fuel injectors, said indicator including a first visual indicator for indicating said condition as non-defective and a second visual indicator for indicating said condition as defective;

at least one fourth output lead for electrical connection to the DIS ignition module output terminal associated with at least one of the plurality of spark plugs; and an indicator associated with said at least one fourth output lead for indicating a condition of the DIS ignition module output to the at least one of the plurality of spark plugs, said indicator including a first visual indicator for indicating said condition as non-defective and a second visual indicator for indicating said condition as defective.

10. The ignition module tester of claim 9 wherein said first indicator is an LED for emitting light of a first color and wherein said second visual indicator is an LED for emitting light of a second color.

11. The ignition module tester of claim 9 wherein said first DIS ignition module input signal is produced as a pulsed signal and as a square wave signal, and wherein said second DIS ignition module input signal is produced as a pulsed signal and as a square wave signal, said at least one electrical terminal including one electrical terminal for electrical connection to said first DIS ignition module input signal produced as a pulsed signal, one electrical terminal for electrical connection to said first DIS ignition module input signal produced as a square wave signal, one electrical terminal for electrical connection to said second DIS ignition module input signal produced as a pulsed signal, and one electrical terminal for electrical connection to said second DIS ignition module input signal produced as a square wave signal.

* * * * *